United States Patent [19]

Piper

[11] Patent Number: 5,610,612
[45] Date of Patent: Mar. 11, 1997

[54] METHOD FOR MAXIMUM LIKELIHOOD ESTIMATIONS OF BEARINGS

[76] Inventor: John E. Piper, 157 Boca Lagoon Dr., Panama City Beach, Fla. 32408-5101

[21] Appl. No.: 517,775

[22] Filed: Aug. 21, 1995

Related U.S. Application Data

[63] Continuation-in-part of Ser. No. 206,432, Mar. 7, 1994, Pat. No. 5,495,256.

[51] Int. Cl.$^6$ .................................................. G01S 13/00
[52] U.S. Cl. .................................................. 342/195
[58] Field of Search .................................................. 342/195

[56] References Cited

U.S. PATENT DOCUMENTS

| | | | |
|---|---|---|---|
| H374 | 11/1987 | Abo-Zena et al. | 342/378 |
| 4,739,329 | 4/1988 | Ward et al. | 342/119 |
| 4,806,936 | 2/1989 | Williams et al. | 342/128 |
| 4,965,732 | 10/1990 | Roy, III et al. | 364/460 |
| 5,165,051 | 11/1992 | Kumar | 327/79 D |
| 5,296,861 | 3/1994 | Knight | 342/357 |
| 5,495,256 | 2/1996 | Piper | 342/195 |

OTHER PUBLICATIONS

Wu, Qiang and Daniel R. Fuhrmann, "A Parametric Method of Determining the Number of Signals in Narrow–Band Direction Finding", IEEE Transactions on Signal Processing, vol. 39, No. 8, Aug. 1989.

Ziskind et al, "Maximum Likelihood Localization of Multiple Sources by Alteranting Projection", IEEE Transactions on Acoustics, Speech and Signal Processing,. vol. 36, No. 10, Oct. 1988.

Abo–Zena et al, "Optimum Multiple Target Direction and Resolution", Statutory Invention Registration H374, Nov. 3, 1987.

*Primary Examiner*—Mark Hellner
*Attorney, Agent, or Firm*—Carnes, Cona, and Dixon

[57] ABSTRACT

The present invention provides for a method for maximum likelihood estimation of bearings. This method of the present invention utilizes a novel maximum likelihood algorithm which can be employed to process one or two dimensional array data. The method is applicable to radar and sonar direction-of-arrival estimation problems.

13 Claims, 2 Drawing Sheets

Bearing estimation via covariance maximum likelihood method.

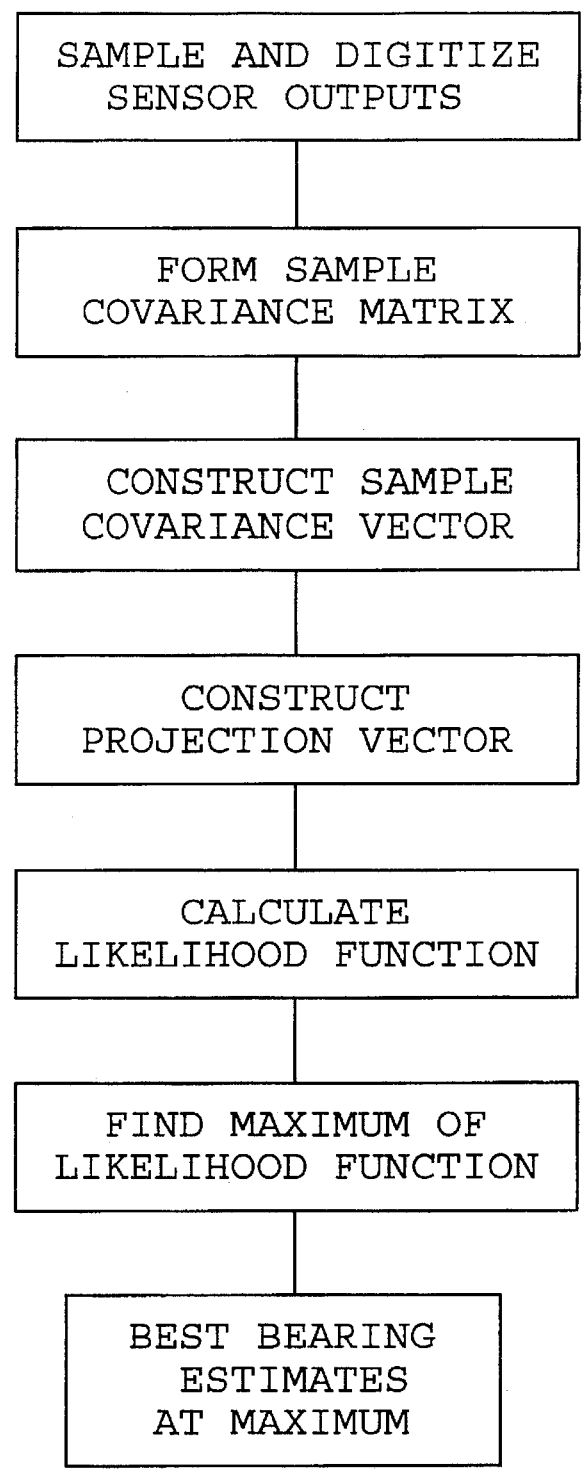
Fig. 1  Bearing estimation via covariance maximum likelihood method.

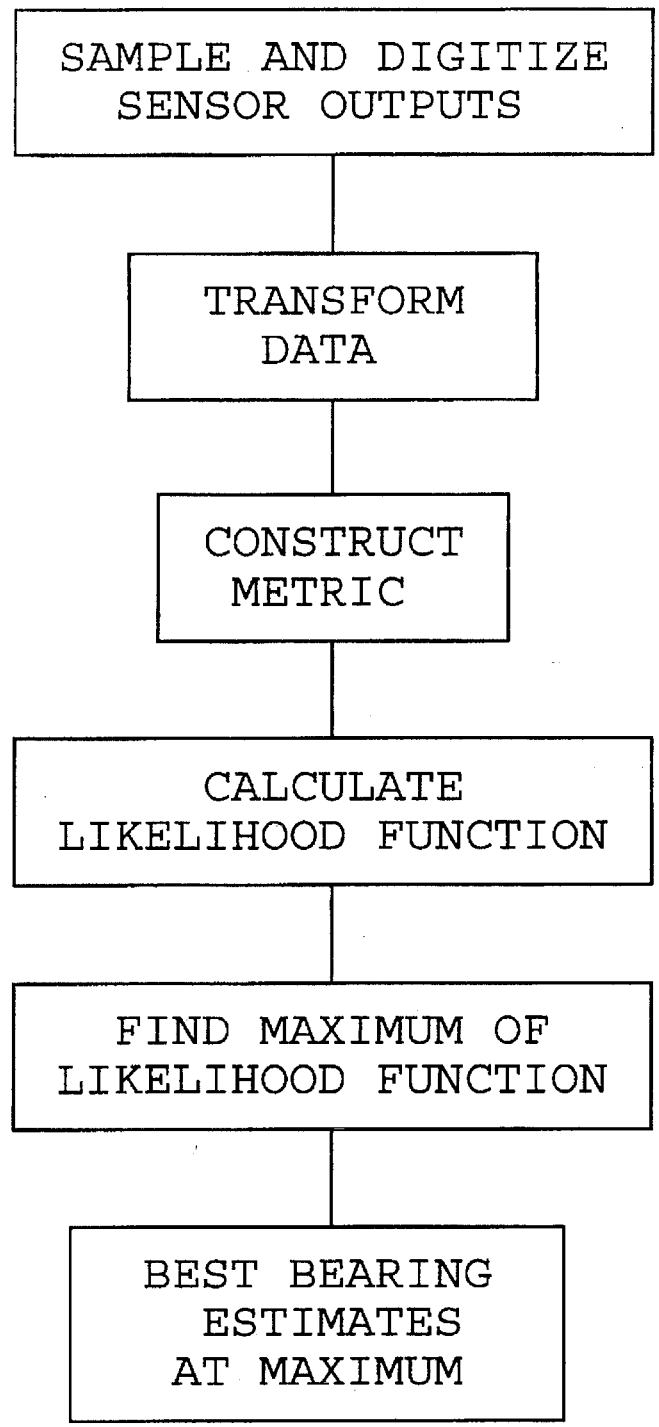
Fig. 2  Bearing estimation via metric maximum likelihood method.

METHOD FOR MAXIMUM LIKELIHOOD ESTIMATIONS OF BEARINGS

This is a continuation-in-part of application Ser. No. 08/206,432 filed Mar. 7, 1994 now U.S. Pat. No. 5,495,256.

BACKGROUND OF THE INVENTION

Bearing estimation is an important topic in sonar and radar applications. Historically, this estimation has been performed by a process called beamforming. The conventional beamformer adds delays to the outputs of sensors along an array. The summation of these signals produces a beam steered in a direction determined by the delay intervals. The angular resolution is given by the wavelength to aperture ratio. This is known as the Rayleigh limit.

Many techniques have been used to increase the resolution of the direction-of-arrival problem. Minimum variance and eigenvector analysis are two techniques that exploit the structure of the sample covariance matrix. A promising technique is the maximum likelihood method. This is a robust method that works well even with low signal to noise ratios since it does not require inversion of the sample covariance matrix.

The maximum likelihood approach is a classical statistical method which fits the observed data to a parametric model. The best estimate occurs when a set of parameters are found that result in the minimum least squares error. This is also known as the maximum likelihood estimate of the parameters. Historically, the method can be traced back to Carl Friedrich Gauss. Currently, maximum likelihood, along with least squares minimization and chi-square minimization, are seen as the best methods to solve difficult nonlinear problems.

The maximum likelihood method is presently of considerable interest in solving signal processing problems. Theoretical calculations and simulations have shown that estimates based on this method statistically approach the Cramer-Rao limit. This limit is the optimum value derived from information theory. Unfortunately, the traditional maximum likelihood calculations required for this approach have been viewed as computationally too difficult. This is largely due to the complex matrix operations required to evaluate the likelihood function and the nonlinear multidimensional maximization process.

The traditional maximum likelihood method operates on a data vector that is squared to produce a sample covariance matrix. This data representation is used by other high resolution bearing estimation techniques including minimum variance and eigenvector approaches. A recent publication in the *IEEE Signal Processing Letters*, Vol. 1, number 12, pp 203–204, by Piper has shown how the complex maximum likelihood matrix operations can be reduced to a simple vector product. This maximum likelihood approach can be improved to account for an arbitrary number of sources and two dimensional (2-D) array geometries.

SUMMARY OF THE INVENTION

The present invention provides for a method for maximum likelihood estimation of bearings. This method of the present invention utilizes a novel maximum likelihood algorithm which can be employed to process one or two dimensional array data. The method is applicable to radar and sonar direction-of-arrival estimation problems.

The present invention consists of two methods or embodiments for efficiently utilizing maximum likelihood for estimating bearing parameters from one and two dimensional array data. Both methods will enable the estimations from a larger number of sources as well as allowing for a two dimensional array of data.

The first method or covariance maximum likelihood approach exploits the symmetry in the maximum likelihood equation and reduces it from a complex matrix operation to a simple vector product. The bearing or frequency estimations can then be efficiently determined.

The second method or metric maximum likelihood approach provides a novel means for estimating bearing parameters from one and two dimensional array data that does not require construction of the sample covariance matrix. The elimination of the sample covariance matrix decreases the calculating process which increases quadratically with the number of data points.

This second method will first Fourier transform the data then insert a metric operator into the traditional squaring of the transform terms. The metric operator introduces interference terms into the likelihood function. These terms are important for accurate estimation of the bearing parameters.

The first method or covariance maximum likelihood approach and the second method or metric maximum likelihood approach are fundamentally very similar at processing the array data to estimate parameters. The covariance approach first squares the data then transforms it using a projection operator. The metric approach first transforms the data then squares it using a prescribed metric. The preferred approach is likely to be whichever method is computationally more efficient since both methods are based on maximum likelihood and required a nonlinear multidimensional parameter search to find the best estimate of bearing and/or frequency.

Advantages of these methods provide results that include its high resolution capability in a multiple source environment. An additional advantage of these methods is their computationally efficient representation and computation of the likelihood function for determining the bearing or frequency estimations.

Accordingly, it is an object of the present invention to provide for a method of utilizing maximum likelihood algorithm

BRIEF DESCRIPTION OF THE DRAWINGS

FIG. 1 is a block diagram illustrating the steps utilized with the first method or first embodiment of the present invention.

FIG. 2 is a block diagram illustrating the steps utilized with the second method or second embodiment of the present invention.

DETAILED DESCRIPTION

The present invention provides for a method for determining bearing estimation parameters, to a source. The source can include, but not be limited to, a uniform array of sensors, a two dimensional (2-D) array of sensors, time series data, or the like. The method of the present invention utilizes a novel and non-obvious maximum likelihood algorithm which can be employed to process one or two dimensional array data, time series data, or the like. This method of the present invention is applicable to radar and sonar direction-of-arrival estimation or frequency estimation problems.

The block diagram of FIG. 1 is a combination of a circuit diagram and flow chart which illustrates one way this method can be utilized. It is to be understood that the block diagram of FIG. 1 is only one example of an implementation for the method of the present invention, and it is further contemplated that other implementations, such as time series data, two-dimensional (2-D) data, or the like, can be utilized within the scope of skill of the ordinary artisan.

The first step in the process of the present invention is to collect data from a plurality of sensors, $S_1, S_2, \ldots$ and $S_m$, (10). The sensors will have electrical outputs which will vary with the variations in energy incident thereon from discrete remote targets, from remote noise sources, and from any noise generated in sensors or their amplifiers. The output of each of the sensors is applied to an analog to digital (A/D) converter. This digitized data can be thought of as forming a vector $y(n)$.

The second step of the method of present invention is to form a sample covariance matrix (R) from the digitized data vector. This covariance matrix is represented by:

$$R = \frac{1}{M} \sum_{n=1}^{M} y(n)y(t)^\dagger \tag{1}$$

where M represents the number of snapshots used to construct the sample covariance matrix.

The third step of the method is to constrain the sample covariance matrix R to be Toeplitz. This constraint requires the diagonal to have the same value due to symmetry consideration. Implementation of this constraint can be easily done by simply averaging the numbers along the matrix diagonals. These averaged diagonal values are to be considered as the element of a constrained covariance vector, $R_m$.

With the sample covariance matrix, R, constrained to be Toeplitz, $R_m$, it is possible to simplify the likelihood function $$L = tr[PR] \rightarrow \sum_{m=1}^{p-1} R_m \sum_{n=1}^{p-m} (P_{n\,n+m} + P_{n+m\,n}) \tag{2}$$

by defining a projection vector $$P_m \doteq \sum_{n=1}^{p-m} (P_{n\,n+m} + P_{n+m\,n}) \tag{3}$$

The likelihood function can now be represented as the inner product of $R_m$ and $P_m$.

$$L = \sum_{m=1}^{p-1} R_m P_m \tag{4}$$

The derivation of an analytical representation of the projection vector is nontrivial. The maximum likelihood projection operator is defined as $$P = D(D^\dagger D)^{-1} D^\dagger \tag{5}$$

where $$D_{mn} = e^{i(m-1)k_n} \tag{6}$$

D is called the steering or signal matrix. The $n^{th}$ column corresponds to the $n^{th}$ signal mapping onto the array. Thus, D has p rows and q columns where p is the number of sensors in the array and q is the number of signals. For uniformly spaced sensors the steering matrix has a Vandermonde structure.

This structure is useful in deriving the projection vector. It is convenient to define the following matrix elements $$C_{mn} = (D^\dagger D)_{mn} \tag{7}$$

and $$b_{mn} = (D^\dagger D)^{-1}{}_{mn} \tag{8}$$

The $C_{mn}$ terms are simply summations of finite geometric series $$c_{mn} = \frac{1 - e^{-ip(k_m - k_n)}}{1 - e^{-i(k_m - k_n)}} \tag{9}$$

The projection vector can now be represented as $$P_m = \sum_{n_2=1}^{q} \sum_{n_1=1}^{q} b_{n_2 n_1}(e^{imk_{n_2}} + e^{-imk_{n_1}}) \sum_{n=1}^{p-m} e^{-i(n-1)(k_{n_1}-k_{n_2})} \tag{10}$$

Separating the $n_1 = n_2$ terms yields $$p_m = \sum_{n=1}^{q} b_{nn} 2(p-m)\cos(mk_n) + \tag{11}$$

$$\sum_{n_2=1}^{q} \sum_{n_1=1}^{q} b_{n_2 n_1}(e^{imk_{n_2}} + e^{-imk_{n_1}}) \sum_{n=1}^{p-m} e^{-i(n-1)(k_{n_1}-k_{n_2})} \quad \text{for } n_1 \neq n_2$$

Multiplying the double summation by $c_{n_1 n_2}$ and regrouping allows the projection vector to be written as $$P_m = \sum_{n=1}^{q} b_{nn} 2(p-m)\cos(mk_n) + \sum_{n_2=2}^{q} \sum_{n_1=1}^{n_2-1} b_{n_2 n_1} c_{n_1 n_2} \times \tag{12}$$

$$\left[ (e^{imk_{n_2}} + e^{-imk_{n_1}}) \frac{1 - e^{-i(p-m)(k_{n_1}-k_{n_2})}}{1 - e^{ip(k_{n_1}-k_{n_2})}} + (e^{imk_{n_1}} + e^{-imk_{n_2}}) \frac{1 - e^{-i(p-m)(k_{n_2}-k_{n_1})}}{1 - e^{ip(k_{n_2}-k_{n_1})}} \right]$$

Expressing the complex conjugate terms in brackets as trigonometric functions and regrouping terms results in the following analytical representation of the projection vector $$P_m = 2 \sum_{n=1}^{q} \cos(mk_n) - 2m \sum_{n=1}^{q} b_{nn} \cos(mk_n) - \tag{13}$$

$$2 \sum_{n_2=2}^{q} \sum_{n_1=1}^{n_2-1} b_{n_2 n_1} c_{n_1 n_2} \frac{\sin(p(k_{n_1} - k_{n_2}))}{1 - \cos(p(k_{n_1} - k_{n_2}))} (\sin(mk_{n_1}) - \sin(mk_{n_2}))$$

Knowing the analytical representation of the projection vector, the next step in the process of the present invention is to multiply the projection vector $P_m$ by the sample covariance vector in order to calculate the maximum likelihood function (see equation 4).

The likelihood function is maximized with respect to the wavenumber parameter.

The best estimates of bearings are found at the maximum value of the likelihood function. This step in the algorithm will require a nonlinear multidimensional search in parameter space. Many techniques are available to solve this maximization problem. Typically, different maximization searches have various strengths and weaknesses and the optimal maximization algorithm depends strongly on the particular application and the available computer resources.

Grid searches which sample the likelihood function at regular intervals in parameter space are most robust at locating the global maximum. An example is given below. This scenario contains two source frequencies at 89 Hz and 89.5 Hz sampled at 200 Hz for one second. The likelihood function for this example is constructed and sampled in 0.1 Hz intervals for both parameters. The likelihood function valves at these sampled points is shown in table 1. The maximum value is located where one parameter is 89 Hz and the other parameter is 89.5 Hz. These parameters are therefore the maximum likelihood estimators.

TABLE 1

| | | | | | | | | | | |
|---|---|---|---|---|---|---|---|---|---|---|
| 88.5 Hz | 409 | 429 | 444 | 452 | 451 | 438 | 410 | 367 | 313 | 256 | 202 |
| | 421 | 438 | 452 | 461 | 463 | 456 | 437 | 405 | 361 | 309 | 257 |
| | 432 | 447 | 460 | 468 | 472 | 470 | 458 | 403 | 362 | 315 |
| | 442 | 455 | 466 | 474 | 479 | 478 | 472 | 458 | 436 | 406 | 369 |
| | 452 | 462 | 471 | 478 | 482 | 483 | 480 | 472 | 458 | 437 | 411 |
| 89 Hz | — | 469 | 475 | 480 | 483 | 484 | 483 | 478 | 469 | 455 | 438 |
| | 469 | — | 478 | 481 | 483 | 483 | 481 | 477 | 471 | 461 | 449 |
| | 475 | 478 | — | 481 | 480 | 479 | 476 | 472 | 466 | 458 | 449 |
| | 480 | 481 | 481 | — | 477 | 473 | 458 | 462 | 455 | 447 | 438 |
| | 483 | 483 | 480 | 477 | — | 466 | 459 | 451 | 442 | 432 | 422 |
| 89.5 Hz | 484 | 483 | 479 | 473 | 466 | — | 447 | 437 | 426 | 414 | 401 |
| | 89 Hz | | | | | 89.5 Hz | | | | | 90 Hz |

Other more sophisticated techniques may be used to solve this nonlinear multidimensional maximization problem. A number of iterative algorithms initially guess a solution then take steps in the direction that maximizes the function until the maximum is found. Problems with this approach include questions of starting position, step size and convergences to a local instead of a global maximum. Nevertheless, iterative approaches can be very powerful and efficient and are often used. Two references that discuss maximization algorithms includes: Philip Bevington, "Data Reduction and Error Analysis for the Physical Sciences," McGraw-Hill, 1969 and William Press, et al., "Numerical Recipes, the Art of Scientific Computing," Cambridge University Press, 1988.

This maximum likelihood approach can be employed to estimate frequencies using time series data. This application is based on the well known duality between the spatial domain and the temporal domain. Instead of sampling along a uniform array to estimate source bearings, the method can sample at uniform time intervals to estimate source frequencies.

Alternatively, the above discussed embodiment can be used for two dimensional (2-D) arrays. For two dimensional arrays this likelihood function approach can be used with some modifications. It is necessary to define two axes. These need not be orthogonal, but the sensor spacing along the axes needs to be uniform. This allows the 2-D data to be Toeplitz constrained which leads to a constrained covariance matrix representation. Letting $Y_{mn}$ be the measured 2-D data then the constrained covariance matrix representation is given by $$R_{mn} = \sum_i \sum_j Y_{ij} Y_{i+m\,j+n} \tag{14}$$

The corresponding 2-D projection operator, $P_{mn}$, is constructed from the projection vectors corresponding to the two axes, $P_m$ and $P_n$.

$$P_{mn} = P_m P_n \tag{15}$$

The 2-D likelihood function can then be written as $$L = \sum_m \sum_n P_{mn} R_{mn} \tag{16}$$

This representation allows a natural and efficient calculation of the likelihood function and thus leads to a novel and efficient estimation of the bearing parameters from 2-D array data.

A novel application of utilizing this 2-D maximum likelihood approach is the simultaneous estimation of bearing and frequencies. This can be accomplished using time series data from a number of sensors along a uniform array. This data forms a 2-D matrix and the 2-D likelihood function can be used to estimate both bearing and frequency. The advantage over traditional methods is the simultaneous high resolution of bearing and frequency.

It is of some interest to avoid calculating the covariance and to allow for more general (nonuniform) array geometries. An alternative or second embodiment for utilizing the likelihood function permits for this more general (nonuniform) array geometries. For many signal processing problems this alternative representation allows for an efficient method of utilizing maximum likelihood formulation for bearing estimations.

Construction of the alternative or second embodiment using the likelihood function begins with assigning the measured data, Y, to a number of sources, s, plus noise, N.

$$Y = \tau_1 s_1 + \tau_2 s_2 + \ldots + N \tag{17}$$

where

Y=observation matrix for 2-D array $\tau_n$=matrix which maps $n^{th}$ source onto array $s_n$=signal from $n^{th}$ source N=noise matrix The likelihood function can then be written as $$L = tr(Y^\dagger - \tau_1^{554} s_1{}^* - \tau_2^\dagger s_2{}^* - \ldots)(Y - \tau_1 s_1 - \tau_2 s_2 - \ldots) \tag{18}$$

or $$L = (Y^\dagger Y) - tr(Y^\dagger \tau_1) s_1 - tr(Y^\dagger \tau_2) s_2 - \ldots - tr(\tau_1{}^\dagger Y) s_1{}^* - tr(\tau_2{}^\dagger Y) s_2{}^* - \ldots \\ + tr(\tau_1{}^\dagger \tau_1) s_1{}^* s_1 + tr(\tau_1{}^\dagger \tau_2) s_1{}^* s_2 + \ldots tr(\tau_2{}^\dagger \tau_1) s_2{}^* s_1 + \ldots \tag{19}$$

This representation can be simplified by defining the following quantities $$S = \begin{bmatrix} s_1 \\ s_2 \\ \vdots \end{bmatrix} \tag{20}$$

$$x = \begin{bmatrix} tr(\tau_1{}^\dagger Y) \\ tr(\tau_2{}^\dagger Y) \\ \vdots \end{bmatrix} \tag{21}$$

$$T = \begin{bmatrix} tr(\tau_1{}^\dagger \tau_1) & tr(\tau_1{}^\dagger \tau_2) & \ldots \\ tr(\tau_2{}^\dagger \tau_1) & tr(\tau_2{}^\dagger \tau_2) & \ldots \\ \vdots & \vdots & \end{bmatrix} \tag{22}$$

The likelihood function can then be compactly written as $$L = tr(Y^\dagger Y) - x^\dagger s - s^\dagger x + s^\dagger T s \tag{23}$$

Maximizing with respect to s and $s^\dagger$ yields $$\frac{\partial L}{\partial L} = -x^\dagger + s^\dagger T = 0 \Rightarrow s^\dagger = x^\dagger T^{-1} \quad (24)$$

$$\frac{\partial L}{\partial s^\dagger} = -x + Ts = 0 \Rightarrow s = T^{-1}x \quad (25)$$

Inserting these values into the likelihood function yields $$L = tr(Y^\dagger Y) - x^\dagger T^{-1} x - x^\dagger T^{-1} x + x^\dagger T^{-1} T T^{-1} x \quad (26)$$

$$L = tr(Y^\dagger Y) - x^\dagger T^{-1} x \quad (27)$$

It is convenient to drop the first term since it is a constant. It is also convenient to invert the overall sign which turns it into a maximization problem instead of a minimization problem. Thus, the likelihood function can be expressed as $$L = x^\dagger T^{-1} x \quad (28)$$

The x vector is the Fourier transform of the array data evaluated at a number of points. Instead of the likelihood function being simply the square of these points (as is traditionally assumed) this method introduces a metric operator, $T^{-1}$, to the product.

This second method is computationally efficient for a number of reasons:

1. It is not necessary to construct a sample covariance matrix.

2. The size of the x vector is only as large as the number of sources.

3. The method builds upon conventional Fourier Transform methods.

4. The computational load scales linearly with the data points.

Although this maximum likelihood approach is derived specifically for processing 2-D array data, it can easily applied to 1-D, 2-D, 3-D, or 4-D array data. The required modification simply concerns the usage of the trace operator. For one dimensional data the trace operator becomes a simple vector inner product.

$$tr(x^T y) = \sum_i x_i y_i \quad 1\text{-}D \quad (29)$$

It is convenient to define a generalized inner product for arrays of higher dimension. Thus the trace operator becomes:

$$\begin{aligned} tr(A^T B) &= \sum_i \sum_j A_{ij} B_{ij} \quad 2\text{-}D \\ &= \sum_i \sum_j \sum_k A_{ijk} B_{ijk} \quad 3\text{-}D \\ &= \sum_i \sum_j \sum_k \sum_l A_{ijkl} B_{ijkl} \quad 4\text{-}D \end{aligned} \quad (30)$$

This notation allows for the maximum likelihood signal processing to be used for a variety of applications. These include sensor arrays of one, two or three dimensions. It can also include time series data which can be thought of as another dimension in the problem. The spatial dimensions yield direction of arrival estimates and the temporal dimension yields frequency estimates. This invention allows any combination of simultaneous bearing and frequency parameter estimation.

The best direction-of-arrival estimates are found at the maximum value of the likelihood function. This step in the algorithm will require a nonlinear multidimensional search in parameter space. Many techniques are available to solve this maximization problem. These include grid searches, Marquardt's method, Newton-Gauss searches, etc. Typically different maximization searches have various strengths and weaknesses and the optimal maximization algorithm depends strongly on the particular application and the available computer resources.

A novel but important use of the maximum likelihood method is to suppress interference. Traditionally this has been done by weighting (windowing) the data to reduce sidelobe effects. Since the maximum likelihood method parameterizes the sources and accounts for the interference effects, it is only natural to use these signal processing strengths. The recipe is simply to fix the strong source parameter(s) at its best estimate. This allows its effects to be essentially eliminated and allows other sources to be easily resolved.

This metric maximum likelihood approach and the traditional covariance maximum likelihood approach are fundamentally very similar at processing the array data to parameter estimation. The metric approach first transforms the data then squares it using a prescribed metric. The covariance approach first squares the data then transforms it using a projection operator. The preferred approach is likely to be whichever method is computationally more efficient since both methods are based on maximum likelihood and require a nonlinear multidimensional parameter search to find the best estimate of bearing and/or frequency.

While the invention has been particularly shown and described with reference to the embodiment thereof, it will be understood by those skilled in the art that various changes in form and detail may be made without departing from the spirit and scope of the invention.

I claim:

1. A method of estimating parameters from sensor outputs, said method implementing the steps of:

(a) sampling and digitizing said sensor outputs;

(b) forming a sample covariance matrix from said sampled and digitized outputs of said sensors;

(c) averaging the diagonals of said sample covariance matrix;

(d) averaging diagonals of said sampled covariance matrix for obtaining a sample covariance vector ($R_m$);

(e) providing a projection vector ($P_m$) where $$P_m = 2 \sum_{n=1}^{q} \cos(m k_n)$$

$$-2m \sum_{n=1}^{q} b_{nn} \cos(m k_n)$$

$$-2 \sum_{n_2=2}^{q} \sum_{n_1=1}^{n_2-1} b_{n_2 n_1} c_{n_1 n_2} \frac{\sin(p(k_{n_1} - k_{n_2}))}{1 - \cos(p(k_{n_1} - k_{n_2}))} (\sin(m k_{n_1}) - \sin(m k_{n_2}));$$

for $k_n$ to be the parameter of the nth source;

(f) computing a likelihood function (L) by multiplying said sample covariance vector with said projection vector;

(g) maximizing said likelihood function with respect to said parameters;

(h) resulting said parameters at said maximum for providing a best estimate of parameters.

2. A method as in claim 1 wherein said sensor outputs is an uniform array of sensors and said parameter for said $k_n$ is to be a wavenumber for determining an estimate of bearings.

3. A method as in claim 1 wherein said data vector is a time series and said parameter for said $k_n$ is to be a digital frequency for determining a best estimate of frequencies.

4. A method as in claim 3 wherein said sample covariance vector ($R_m$) is constructed from the autocorrelation function of said sensors sampled at a number of discrete time lags.

5. A method of estimating parameters from a 2-dimensional (2-D) array of sensor outputs, said method implementing the steps of:

(a) sampling and digitizing said sensor outputs;

(b) forming a constrained 2-D covariance matrix ($R_{mn}$) from said sampled and digitized outputs of said sensors;

(c) forming a 2-D projection matrix ($P_{mn}=P_m P_n$) where $$P_m = 2 \sum_{n=1}^{q} \cos(mk_n) - 2m \sum_{n=1}^{q} b_{nn} \cos(mk_n) - 2 \sum_{n_2=2}^{q} \sum_{n_1=1}^{n_2-1} b_{n_2 n_1} c_{n_1 n_2} \frac{\sin(p(k_{n_1} - k_{n_2}))}{1 - \cos(p(k_{n_1} - k_{n_2}))} (\sin(mk_{n_1}) - \sin(mk_{n_2}));$$

for $k_n$ to be the parameter of the $n^{th}$ source;

(d) computing a likelihood function (L) by multiplying said constrained 2-D covariance matrix with said 2-D projection matrix and taking the trace $$L = tr(P^T R) = \sum_m \sum_n P_{mn} R_{mn};$$

(e) maximizing said likelihood function with respect to said 2-D parameters; and (f) resulting said 2-D parameters at said maximum for providing best estimate of 2-D parameters.

6. A method as in claim 5 wherein said 2-D array of sensor outputs is constructed with one dimension corresponding to a spatial position along said array and a second dimension corresponding to a time series data.

7. A method of estimating parameters from sensor outputs, said method implementing the steps of:

(a) sampling and digitizing outputs from said sensor outputs (Y);

(b) providing said sensor output data $x_m = tr(\tau_m^\dagger Y)$ where $\tau_m$ is the vector or matrix which maps the $m^{th}$ signal onto said sensors;

(c) forming a metric operator ($T^{-1}$) where $T_{mn}=tr(\tau_m^\dagger \tau_n)$ (d) computing a likelihood function by squaring said transformed data using said metric operator, $L=X^\dagger T^{-1} x$ (e) maximizing said likelihood function with respect to said parameters;

(f) resulting said parameters at said maximum for providing best estimate of parameters.

8. A method as in claim 7 wherein said sensor outputs is an one dimensional (1-D) array of sensors.

9. A method as in claim 7 wherein said one dimensional (1-D) array of sensors forms a time series vector.

10. A method as in claim 7 wherein step (a) further includes the step of first Fourier transforming said time series to yield said 1-D phased array signal (y).

11. A method as in claim 7 wherein said sensor outputs includes a 2-D array of sensors.

12. A method as in claim 7 wherein time series output of said 2-D array of sensors is Fourier transformed to yield a phased array signal.

13. A method as in claim 11 wherein said 2-D array of sensor outputs is constructed with one dimension corresponding to a spatial position along said array and a second dimension corresponding to a time series data.

* * * * *